UNITED STATES PATENT OFFICE.

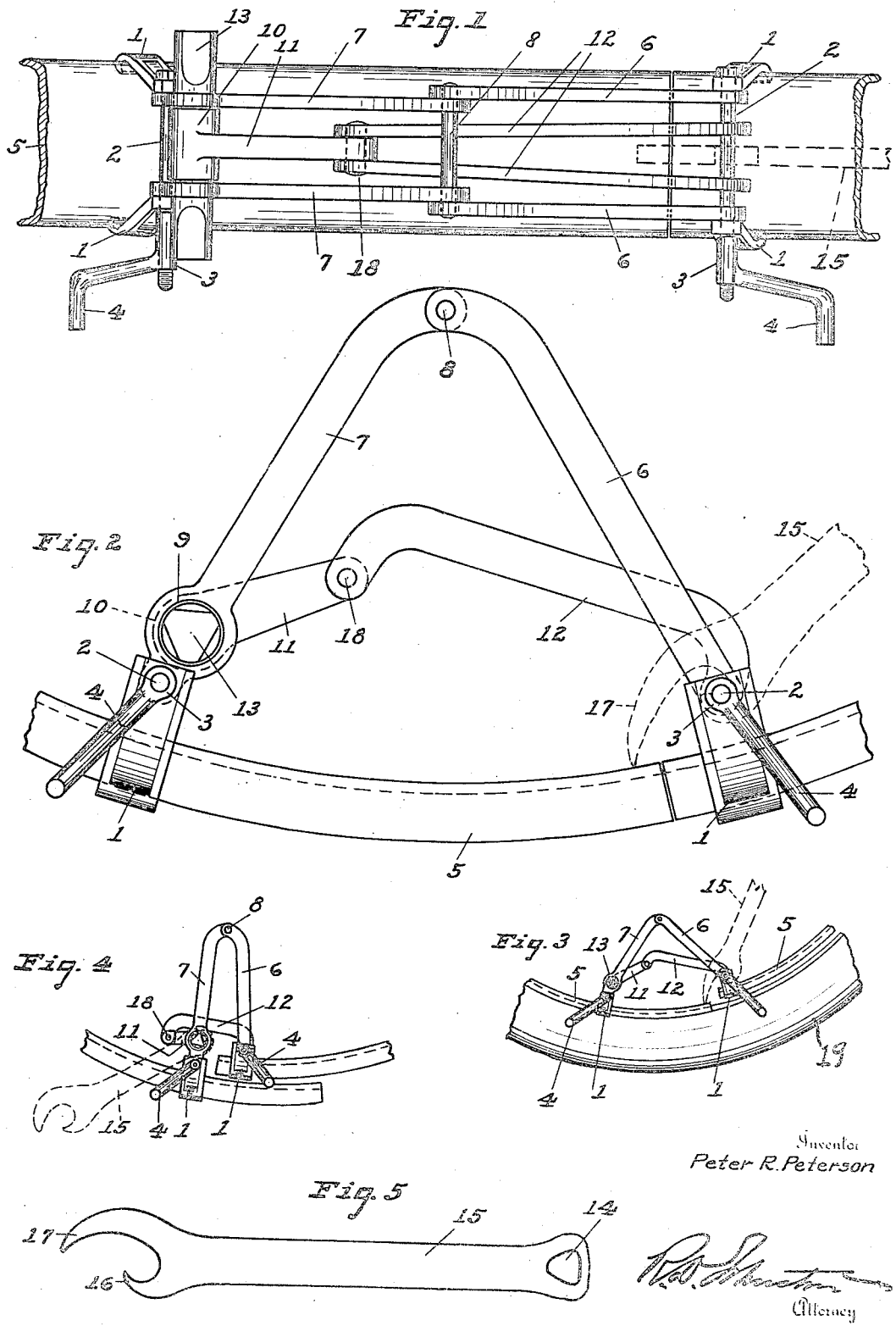

PETER R. PETERSON, OF SALT LAKE CITY, UTAH, ASSIGNOR TO IDEAL RIM TOOL CO., OF JACKSONVILLE, FLORIDA, A CORPORATION OF FLORIDA.

RIM TOOL.

1,423,875.     Specification of Letters Patent.     Patented July 25, 1922.

Application filed June 29, 1921. Serial No. 481,315.

*To all whom it may concern:*

Be it known that I, PETER R. PETERSON, a citizen of the United States of America, residing at Salt Lake City, in the county of Salt Lake and State of Utah, have invented certain new and useful Improvements in Rim Tools, of which the following is a specification.

My invention relates to a tool adapted to be clamped to the ends of a split demountable vehicle rim for the purpose of providing an efficient mechanical means by which the rim can be quickly and easily released from the tire and expanded back into position to receive a replaced tire and be remounted on the wheel.

My invention has the special advantages of being positive and safe in its operations, light and easy to apply, and collapsible to occupy but small storage space. It is illustrated in its preferred embodiment only in the accompanying drawings, in which:—

Fig. 1 is a plan view of my tool applied to an automobile wheel rim, preparatory to operation.

Fig. 2 is a side elevation of Fig. 1.

Fig. 3 illustrates the initial operating position of the tool with the rim ends relatively displaced ready for contraction.

Fig. 4 illustrates the rim ends drawn to contracted position.

Fig. 5 illustrates the lever utilized to operate the tool.

In the drawings similar parts are similarly designated.

In its preferred embodiment illustrated, my invention comprises two pairs of co-acting duplicate clamp jaws 1 connected in pairs by threaded bolts 2 which pass through suitable bolt holes in the corresponding end of each clamp, which ends are recessed to receive and lock the square bolt heads against rotation. A nut 3 provided with a crank 4 is screwed on the threaded end of each bolt and serves to cause its respective jaws to positively clamp between them the side edges of a split demountable automobile tire rim 5. The two pairs of clamps are hingedly connected together by pairs of links 6 and 7 which are pivotally connected together at one end by a pin or rivet 8 and at their other ends loosely receive the bolts 2 of their respective clamps. In opposite openings 9 in the links 7 is journaled a rocking shaft 10 having an enlarged middle portion serving to space the links 7 and to carry an arm 11, the free end of which is hingedly connected by pin 18 to the angled ends of a pair of links 12, which are loosely connected to the same bolt 2 as the links 6. The ends 13 of the rocking shaft 10 where they project beyond the links 7 are flattened to fit in a triangular wrench opening 14 in one end of the lever wrench 15 which, at its other end, is bifurcated to provide a short curved bottom jaw 16 overhung by a longer curved jaw 17.

The operation of my device is as follows. The clamps are applied on the rim by screwing up the tail nuts 3, the clamp associated with the links 6 being applied adjacent to the cut in the rim while the other clamp is applied with the links substantially in the position shown in Fig. 2. I now apply lever 15 with its jaw engaged under the clamp bolt 2 between the links 12 and its jaw 17 engaging the rim beyond the cut therein, and moving the lever upwardly to the position shown in Fig. 3, I draw the abutting ends of the rim apart and move them out of circular alignment so that when released the rim ends will assume a natural position in which one will slightly overlap the other. Thereupon the wrench socket 14 is applied to an end 13 of the rocking shaft 10 which is turned in its bearings to rock the arm 11 over the opposite side of the link 7 and until the pivot 18 connecting it to the links 12 has moved beyond dead center position with relation to the shaft 10 and the remote clamp bolt 2, which occurs when the links 12 engage the rocker shaft 10. To permit this movement past dead center one, or, as shown, both ends of the links are angled. The tool will remain locked in this position (see Fig. 4) with the rim contracted so that the tire can be freely removed from or replaced on the rim. To mount a tire 19 on the rim, it is applied with the rim contracted, as in Fig. 4, and then the wrench 15 is inserted transversely between the rim and arm 11 and the latter lifted past dead center position, whereupon the rim snaps back to its natural position with its ends slightly overlapped. The wrench is now applied to the rocker shaft 10, preferably in a position diametrically opposite to that indicated in Fig. 4, and by pressing it down by foot or hand the rim ends are brought again into abutting position, whereupon the tool is removed by releasing the clamps. I prefer to employ pairs of links 6, 7 and 12 instead of single links.

Having thus described my invention, what I claim as new and desire to secure by Letters Patent, is:—

1. A rim tool, comprising a pair of rim engaging clamps, a lever for pivotal engagement on one of said clamps, and having a portion thereof adapted to bear against the inner face of one end of a rim while the clamp on which it is pivotally engaged holds the other end of the rim, coacting links pivoted together and to said clamps, a crank member journaled in one of the first mentioned links, and a link pivoted at one end to one of said first mentioned links and at the other end to the crank member.

2. A rim tool, comprising clamps to engage the rim on opposite sides of the cut therein, a lever for pivotal engagement in connection with one of said clamps, and adapted to contact with the inner face of said rim, links connecting said clamps, a rocking shaft with an arm journaled in one of said links, and a link pivoted to the arm of the rocking shaft and to one of the first mentioned links.

3. In a rim tool, a pair of clamps adapted to be secured to opposite ends of a rim, a pair of links pivoted together and to the clamps, an arm pivotally mounted in one of the links, and adapted to be positively operated to swing its free end from one side to the other of the link on which it is mounted, means having connection with said end of said arm to move the clamps and links toward and from each other, and a lever adapted to bear against one end of the rim to force the same outwardly while forcing the other end inwardly through fulcrum engagement with some part attached to the last mentioned rim end.

In testimony whereof I affix my signature.

PETER R. PETERSON.

Witness:
H. A. BEASON.